(12) United States Patent
Nugteren et al.

(10) Patent No.: US 12,347,156 B2
(45) Date of Patent: Jul. 1, 2025

(54) NEURAL NETWORK MODEL FOR IMAGE SEGMENTATION

(71) Applicant: TomTom Global Content B.V., Amsterdam (NL)

(72) Inventors: Cedric Nugteren, Amsterdam (NL); Elias Kassapis, Amsterdam (NL); Georgi Dikov, Amsterdam (NL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 423 days.

(21) Appl. No.: 17/917,225

(22) PCT Filed: May 27, 2021

(86) PCT No.: PCT/EP2021/064152
§ 371 (c)(1),
(2) Date: Oct. 5, 2022

(87) PCT Pub. No.: WO2021/239858
PCT Pub. Date: Dec. 2, 2021

(65) Prior Publication Data
US 2023/0186100 A1 Jun. 15, 2023

(30) Foreign Application Priority Data
May 27, 2020 (GB) .................................... 2007918

(51) Int. Cl.
*G06V 10/82* (2022.01)
*G06N 3/094* (2023.01)
(Continued)

(52) U.S. Cl.
CPC ............. *G06V 10/25* (2022.01); *G06N 3/094* (2023.01); *G06V 10/454* (2022.01);
(Continued)

(58) Field of Classification Search
CPC .... G06V 10/82; G06V 10/454; G06V 10/764; G06V 20/56; G06N 3/094
(Continued)

(56) References Cited

U.S. PATENT DOCUMENTS

2019/0080456 A1 3/2019 Song et al.
2020/0294239 A1* 9/2020 Brada ........................ G06T 7/10
2021/0383242 A1* 12/2021 Ostyakov .................. G06T 5/77

FOREIGN PATENT DOCUMENTS

CN 109033095 A 12/2018
CN 110188760 A 8/2019
WO 2019238560 A1 12/2019

OTHER PUBLICATIONS

Search Report for application No. GB2007918.2 dated Oct. 14, 2020.
(Continued)

*Primary Examiner* — Jamares Q Washington
(74) *Attorney, Agent, or Firm* — Buckley, Maschoff & Talwalkar LLC

(57) ABSTRACT

A computer processing system is configured to train a model for use in semantic image segmentation. The model comprises a refinement neural network, a discriminator neural network. The refinement neural network is configured to receive a predicted label distribution for an image, obtain one or more random values from a random or pseudo-random noise source, use the one or more random values to generate a plurality of predicted segmentation maps from the received predicted label distribution and output the plurality of predicted segmentation maps to the discriminator neural network. The computer processing system is configured to train the refinement neural network using an objective function that is a function of an output of the discriminator neural network and that further includes a term representative of a difference between the predicted label distribution
(Continued)

and an average of the plurality of predicted segmentation maps output by the refinement neural network for the predicted label distribution.

20 Claims, 9 Drawing Sheets

(51) Int. Cl.
  *G06V 10/25* (2022.01)
  *G06V 10/44* (2022.01)
  *G06V 10/764* (2022.01)
  *G06V 20/56* (2022.01)

(52) U.S. Cl.
  CPC ............ *G06V 10/764* (2022.01); *G06V 10/82* (2022.01); *G06V 20/56* (2022.01)

(58) Field of Classification Search
  USPC ........................................................ 382/155
  See application file for complete search history.

(56) References Cited

OTHER PUBLICATIONS

Search Report for application No. PCT/EP2021/064152 dated Aug. 31, 2021.

Kohl S. et al., Probabilistic U-Net for Segmentation of Ambiguous Images, arXiv:1806.05034 at arXiv.org, Jun. 13, 2018.

Hung, W. et al., Adversarial Learning for Semi-Supervised Semantic Segmentation, arXiv:1802.07934 at arXiv.org, Feb. 22, 2018.

Kassapis, E. et al., Calibrated Adversarial Refinement for Stochastic Semantic Segmentation, arXiv:2006:13144 at arXiv.org, Jun. 23, 2020.

Zhu J. et al., Toward Multimodal Image-to-Image Translation, arXiv:1711.11586 at arXiv.org, Nov. 30, 2017.

Hong, W. et al., Conditional Generative Adversarial Network for Structured Domain Adaptation, 2108 IEEE/CVF Conference on Computer Vision and Pattern Recognition, Jun. 18, 2018.

Luc P. et al., Semantic Segmentation using Adversarial Networks, arXiv:1611.08408, https://arxiv.org/abs/1611.08408, 2016.

Goodfellow, I. et al., Generative Adversarial Networks, Advances in Neural Information Processing Systems, 3.10.1145/3422622, 2014.

Mirza, M. et al., Conditional Generative Adversarial Nets, arXiv:1411.1784, https://arxiv.org/abs/1411.1784, 2014.

Hu, S. et al., Supervised Uncertainty Quantification for Segmentation with Multiple Annotation, arXiv:1907.01949, https://arxiv.org/abs/1907.01949v1, 2019.

\* cited by examiner

Algorithm 1 Model training with calibration network pretraining require: training data $\mathcal{D}$, learning rate $\eta$, calibration loss scale $\lambda$;

1: procedure TRAINING($\mathcal{D}, \eta, \lambda$)
2:    while not converged do    ▷ Pretraining of $F_\theta$
3:       Sample batch $\{x,y\}_t \subset \mathcal{D}$
4:       Update $\theta_{t+1} \leftarrow \theta_t - \eta \nabla_{\theta_t} \mathcal{L}_{cal}(\{x,y\}_t, \theta_t)$
5:    end while
6:    while not converged do    ▷ Adversarial training of $G_\phi$ and $D_\psi$
7:       Sample batch $\{x,y\}_t \subset \mathcal{D}$
8:       for $i = 1, 2, \ldots, S$ do
9:          Sample $\hat{y}_t^i = G_{\phi_t}(F_{\theta^*}(x_t), \epsilon_i)$    where $\epsilon_i \sim \mathcal{N}(0,1)$
10:       end for
11:       Compute $\hat{y}_t^{avg} = \frac{1}{S}\sum_{i=1}^{S} \hat{y}_t^i$
12:       Compute $\mathcal{L}_{cal}(x_t, \theta^*, \phi_t) = \sum_{i,j,k}(\hat{y}_t^{avg}\log \hat{y}_t^{avg} - \hat{y}_t^{avg}\log F_{\theta^*}(x_t))_{i,j,k}$
13:       Update $\phi_{t+1} \leftarrow \phi_t - \eta \nabla_{\phi_t}(\mathcal{L}_G(\theta^*, \phi_t, \{x,y\}_t) + \lambda \mathcal{L}_{cal}(x_t, \theta^*, \phi_t))$
14:       Update $\psi_{t+1} \leftarrow \psi_t - \eta \nabla_{\psi_t} \mathcal{L}_D(\theta^*, \phi_t, \psi_t, \{x,y\}_t)$
15:    end while
16: end procedure

FIG. 2

Algorithm 2 CASS inference procedure require: test data point $x$, number of predictions $S$:

1: procedure INFERENCE($x, S$)  ▷ Using $\theta^*$ and $\phi^*$ from Algorithm 1
2:    for $i = 1, 2, \ldots, S$ do
3:       Sample $\hat{y} = G_{\phi^*}(F_{\theta^*}(x), \epsilon_i)$    where $\epsilon_i \sim \mathcal{N}(0, 1)$
4:    end for
5: end procedure

FIG. 3

NEURAL NETWORK MODEL FOR IMAGE SEGMENTATION

RELATED APPLICATIONS

The instant application is a national stage application from, and claims priority to, pending international application no. PCT/EP2021/064152, which was filed on 27 May 2021. The instant application also claims priority, via parent application PCT/EP2021/064152, to GB application no. 2007918.2, which was filed on 27 May 2020. Each of these applications is incorporated by reference herein.

BACKGROUND OF THE INVENTION

This invention relates to neural networks for use in semantic image segmentation.

Convolutional neural networks (CNNs) have been successfully applied to various computer vision problems by posing these problems as image segmentation problems. Examples include road scene understanding for autonomous driving, and interpreting medical imaging. For such applications, networks are typically trained with multi-class per-pixel labels that together form an image-sized segmentation map (also referred to herein as a "label"). The output of such a network is then again an image-sized map, representing per-pixel class probabilities.

In likelihood-based semantic segmentation, a neural network can be trained to perform semantic segmentation by training it on training data consisting of pairs of images (e.g. photographs) and corresponding human-labelled segmentation maps. A final segmentation map for a given input image can subsequently be obtained from the trained network by applying the argmax function along the class dimension of the predicted probabilities (i.e. for each pixel, selecting the most probable classification). This segmentation map may be useful in, for example, enabling a self-driving car to determine whether an object in view is likely to be another vehicle or a pedestrian.

However, a shortcoming of likelihood-based semantic segmentation is that it can generate semantic maps that are incoherent. The fundamental reason behind this is the way the training loss is formulated (e.g. using per-pixel cross entropy) such that each output pixel in the segmentation map is considered independently of all others—i.e. no explicit inter-pixel consistency is enforced. In particular, for noisy real-world datasets, maximising the factorised likelihood results in unconfident predictions in regions of label-related inconsistency.

Generative adversarial networks (GANs) have been applied to semantic segmentation problems to try to address the aforementioned issues with the per-pixel loss. GANs work by training two networks in an alternating fashion in a minimax game: a generator neural network is trained to produce semantic segmentation maps, while a binary discriminator neural network is trained to distinguish generated (predicted) segmentation map data ('fake') from ground truth labels ('real'). During training, the generator produces semantic segmentation maps, while the discriminator alternately observes ground truth labels and predicted segmentation maps. After training is completed, copies of the trained generator network can be used to perform semantic segmentation on received images—e.g. to interpret live video of the street scene in a self-driving car.

However, GAN models can, in practice, lead to poor classification outcomes in semantic image segmentation.

In WO 2019/238560, the present applicant proposed training a generator network to perform image segmentation using an objective function that included both an adversarial loss term and a pixel-level cross-entropy loss term. Such an approach can help to stabilize the dynamics of the adversarial training, but is still not always ideal, especially when the training data is noisy.

However, the applicant has now devised a different approach which can still provide good image segmentation performance, even when trained on data that is noisy.

SUMMARY OF THE INVENTION

From a first aspect, the invention provides a computer processing system configured to train a model for use in semantic image segmentation, wherein the model comprises:
 a refinement neural network;
 a discriminator neural network,
wherein the refinement neural network is configured to:
 receive a predicted label distribution for an image;
 obtain one or more random values from a random or pseudo-random noise source;
 use the one or more random values to generate a plurality of predicted segmentation maps from the received predicted label distribution; and
 output the plurality of predicted segmentation maps to the discriminator neural network, and
wherein the computer processing system is configured to train the refinement neural network using an objective function that is a function of an output of the discriminator neural network and that further includes a term representative of a difference between the predicted label distribution and an average of the plurality of predicted segmentation maps output by the refinement neural network for the predicted label distribution.

The computer processing system may further be configured to implement the refinement neural network and/or the discriminator neural network.

From a second aspect, the invention provides a method of training a model for use in semantic image segmentation, wherein the model comprises:
 a refinement neural network; and
 a discriminator neural network,
wherein the refinement neural network is configured to:
 receive a predicted label distribution for an image;
 obtain one or more random values from a random or pseudo-random noise source;
 use the one or more random values to generate a plurality of predicted segmentation maps from the received predicted label distribution; and
 output the plurality of predicted segmentation maps to the discriminator neural network, and
wherein the method comprises training the refinement neural network using an objective function that is a function of an output of the discriminator neural network and that further includes a term representative of a difference between the predicted label distribution and an average of the plurality of predicted segmentation maps output by the refinement neural network for the predicted label distribution.

From a third aspect, the invention provides computer software comprising instructions which, when executed on a computer processing system, cause the computer processing system to train a model for use in semantic image segmentation, wherein the model comprises:
 a refinement neural network;
 a discriminator neural network, wherein the refinement neural network is configured to:
  receive a predicted label distribution for an image;
  obtain one or more random values from a random or pseudo-random noise source;
  use the one or more random values to generate a plurality of predicted segmentation maps from the received predicted label distribution; and
  output the plurality of predicted segmentation maps to the discriminator neural network, and
wherein the instructions cause the computer processing system to train the refinement neural network using an objective function that is a function of an output of the discriminator neural network and that further includes a term representative of a difference between the predicted label distribution and an average of the plurality of predicted segmentation maps output by the refinement neural network for the predicted label distribution.

The computer software may be stored on a non-transient storage medium (such as a magnetic or solid-state memory), or may be carried on a transient signal (such as an electrical or electromagnetic signal). The computer software may further comprise instructions that cause the computer processing system to implement the refinement neural network and/or the discriminator neural network.

From a fourth aspect, the invention provides computer software, or a computer processing system, that implements a trained model for use in semantic image segmentation, the trained model comprising a trained refinement neural network configured to:
  receive a predicted label distribution for an image;
  obtain one or more random values from a random or pseudo-random noise source;
  use the one or more random values to generate a plurality of predicted segmentation maps from the received predicted label distribution; and
  output the plurality of predicted segmentation maps.

The trained refinement neural network may have been trained as disclosed herein—i.e. using an objective function that is a function of an output of a discriminator neural network and that further includes a term representative of the difference between a predicted label distribution and an average of a plurality of predicted segmentation maps output by the refinement neural network for the predicted label distribution.

In some embodiments, the trained model is further configured to calculate an average of the plurality of predicted segmentation maps. It may be configured to output or further process the averaged predicted segmentation map. It may be configured to apply an argmax operation to the averaged predicted segmentation map.

Thus it will be seen that, in accordance with the invention, semantic image segmentation is performed in multiple stages, with predicted label distributions being produced in a first stage, and with a second stage being trained to refine these predicted distribution, using a generative-adversarial approach, by generating a plurality of segmentation maps for each predicted label distribution, using an objective function that encourages the average of the plurality of predicted maps towards the categorical distribution of the respective predicted label distribution.

Such an approach is architecturally different from that disclosed in WO 2019/238560, which used a generator network to perform a complete segmentation, from input image to segmentation map, in a single step, and without creating a plurality of predictions from each input image.

The multi-stage approach of the present approach, in which a predicted label distribution, rather than a raw image, is provided as input for training the generative-adversarial stage, has been found, at least in some instances, to lead to particularly fast convergence.

Incorporating randomness to generate multiple plausible output segmentation maps from the generative refinement network allows the model to cope well with uncertainty in the input data. The present approach has been found to yield high mode coverage (i.e. producing outputs across the whole space, with few missing modes). At the same time, constraining the average of the multiple output labels to be consistent with the predicted label distribution enables the proposals to accurately reflect the underlying data distribution.

The predicted label distribution may be an image-size pixel-wise distribution over a set of labels for the image. It may be a calibrated distribution. It may be a likelihood or probability map for the image.

The refinement neural network may be configured to receive the predicted label distribution from a "calibration" neural network. In some embodiments, the model may additionally comprise this calibration neural network. The calibration neural network may be configured to receive input images and to output a respective predicted label distribution for each input image. It may map each input image to a per-pixel categorical distribution. In particular, it may predict an image-size, calibrated, pixel-wise distribution over a set of labels for the input image. It may perform likelihood-based semantic segmentation. It may use a cross-entropy loss function. It may be a well-calibrated neural network. This can enable the whole model to become well-calibrated, by using the calibrated calibration neural network to calibrate the refinement neural network, as described herein.

The training may be implemented by training logic in the software or computer processing system.

The calibration neural network may be trained on the same training data as the refinement and discriminator networks. It may be trained by the processing system.

However, this is not essential and, in some embodiments, the refinement network may receive predicted label distributions from a calibration neural network that has been independently trained—e.g. on a different system or over a different time period. In some embodiments, the calibration network may be implemented or executed in an inference mode (i.e. not being trained) while the refinement network is being trained. This can advantageously enable the model to trained with a reduced peak computational load.

The processing system may be configured to train the discriminator neural network. The discriminator may be trained alternately with a set of predicted segmentation maps and then with one or more ground-truth segmentation maps (which may be the ground-truth segmentation map corresponding to the segmentation maps, or which may be different ground-truth segmentation maps). The refinement neural network and discriminator neural network may form a generative adversarial network (GAN). They may be trained together. The processing system may be configured to train the refinement network alternately with the discriminator.

The refinement and discriminator neural networks may be trained on training data comprising a set of predicted label distributions and a set of ground-truth (e.g. human-labelled) segmentation maps. The training data may additionally include corresponding input images (e.g. photographs or video frames). In some embodiments, the refinement and/or discriminator neural networks may be conditioned on the input images; this can potentially improve the quality of the segmentation results. The same training data (e.g. the input images and corresponding ground-truth segmentation maps) may be used to train the calibration neural network, although this is not essential, as the calibration network could be trained independently using different training data.

The objective function used to train the refinement neural network may be a loss function. It may be a function (e.g. comprising a weighted sum) of a first objective term a second objective term. The first objective term may depend on an output of the discriminator network. The second objective term (also referred to herein as a calibration term) may depend on a difference between the predicted label distribution and the average of the segmentation maps generated by the refinement network. The first objective term may increase the probability that the predicted segmentation maps are indistinguishable from ground-truth maps by the discriminator network. The second objective term may minimize the difference between the predicted label distribution and the average segmentation map.

The objective function may comprise a weighting parameter, A, for weighting the first objective term relative to the second term. This can enable their relative influence to be adjusted. The system may comprise an input for receiving a value for the weighting parameter—e.g., from a user.

The average of the segmentation maps may, in some embodiments, be determined by calculating the pixel-wise arithmetic mean of the plurality of segmentation maps. However, other embodiments may use other types of averaging, such as a weighted mean.

The difference between the predicted label distribution and the average segmentation map may be expressed in any appropriate way. However, in some embodiments, the difference may represent the cross-entropy between the predicted label distributions and the average segmentation maps. The difference may be the Kullback-Leibler divergence (forward or reverse).

The discriminator network may be trained to minimize a loss on its discrimination between predicted segmentation maps output by the refinement network and ground-truth label data.

The training of any of the neural networks may comprise a gradient descent process.

The model may be trained on a plurality of input images, which may comprise one hundred, one thousand, ten thousand, or more, images.

In some embodiments, the input image may be a photographic image from a camera—e.g. one frame from a video stream. It may be an image of a street scene. The ground-truth label data may comprise data representing one or more object classes for the image.

In some embodiments, each segmentation map has a common size, which may be the number of pixels as the input image and/or predicted label distribution. The predicted label distribution may assign a set of likelihood values to each pixel of the map, representing the likelihoods of that pixel having a respective label (i.e. belonging to a respective class). There may be any number of labels—e.g. 5, 10, 50 or 100 or more. In some embodiments the labels relate to categories in a street scene, and may include "vehicle", "person", "building", etc. Each segmentation map may assign a predicted one of these label to each pixel.

The model may have a training mode and a trained (inference) mode. The training may take place during a training phase. After the training phase, the network may be configured to receive an input image and to segment the input image. In some embodiments, weights may be extracted from the trained refinement neural network and used to create trained models; these may be standalone inference model that do not include the discriminator neural network or any training logic. The trained model may be configured to output one or more predicted segmentation map for the image—e.g. the plurality of segmentation maps, or an average thereof, or the argmax or other function of either of these.

The computer processing system may comprise an input for receiving image data from a camera. It may be an in-vehicle computer processing system. It may be configured to output segmentation data—e.g., to an autonomous driving system.

The images, predicted label distributions, and segmentation maps, may be represented and encoded in any appropriate ways. Data, including training data, may be stored in and accessed from a database or other data retrieval system. Weights for the neural networks may be stored as values in digital memory.

The calibration neural network and/or refinement neural network and/or discriminator neural network may each comprise any number of convolution layers, dense blocks, and other processing layers. The model and/or training logic may comprise software instructions for one or more processors, or may comprise dedicated hardware logic, or may be implemented using a combination of software and application-specific hardware. The software may comprise instructions that are stored in a memory of the computer processing system. The computer processing system may comprise one or more of: CPUs, DSPs, CPUs, FPGAs, ASICs, volatile memory, non-volatile memory, inputs, outputs, displays, network connections, power supplies, radios, clocks, and any other appropriate components. It may comprise one or more servers or supercomputers. It may comprise a microcontroller or system-on-chip (e.g. when implementing a trained model for inference operation). It may be configured to store or display or output a predicted segmentation map or other segmentation data.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIG. 2 is pseudocode for training the model;

FIG. 3 is pseudocode for running the model in an inference mode;

DETAILED DESCRIPTION

Figure 1:
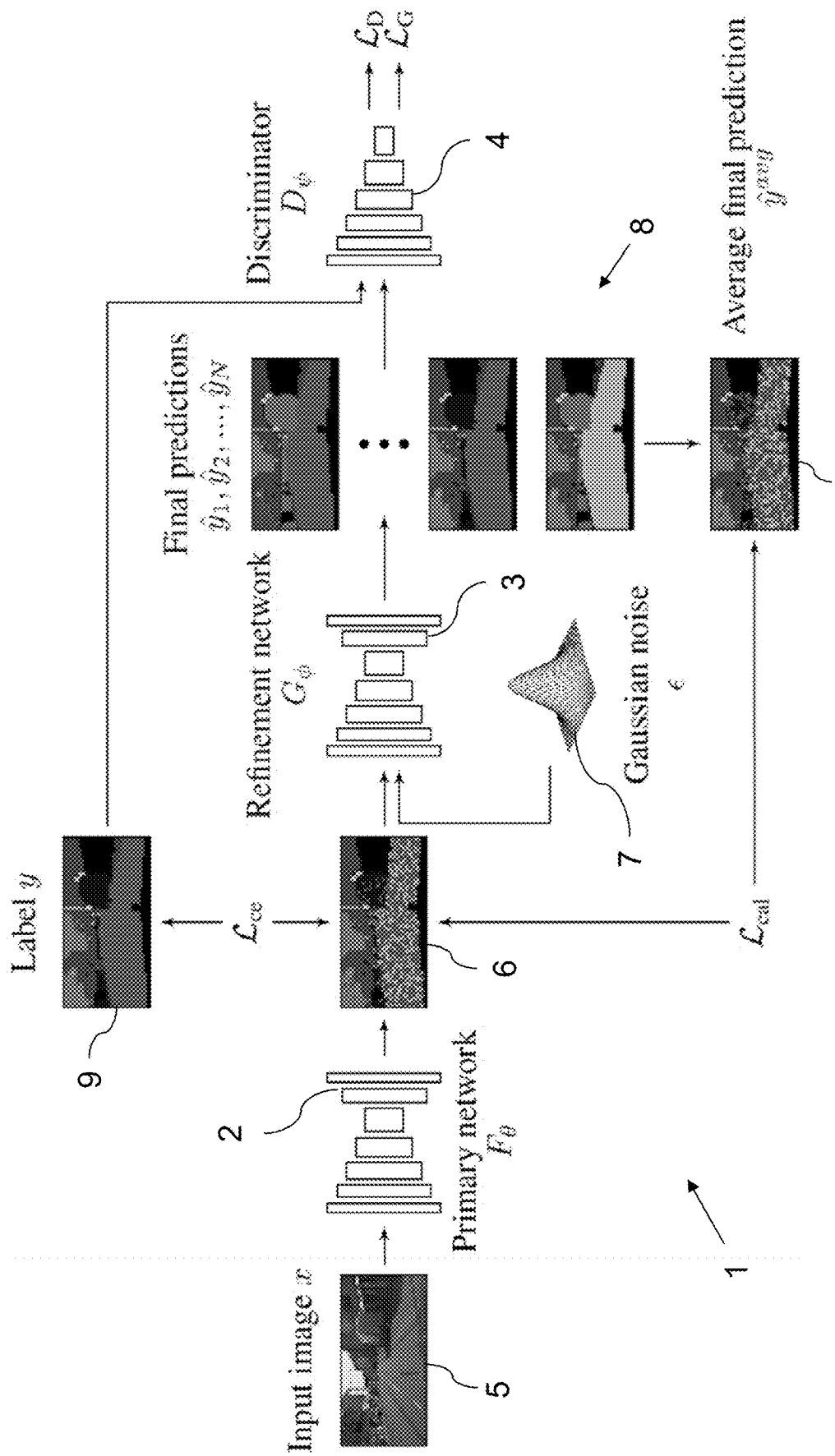
FIG. 1 is a schematic diagram of a semantic segmentation model embodying the invention.

Described below are certain exemplary neural networks, embodying the invention, which use adversarial training for performing semantic image segmentation. Techniques disclosed herein have been tested on the segmentation of street scenes acquired by cameras on automotive vehicles and have been found to be particularly effective at this task, especially where the input data contains noise or ambiguities. However, it should be understood that these networks may be applied to many other image segmentation tasks in diverse fields.

Given an input image $x \in \mathbb{R}^{H \times W \times C}$ of height H, width W, and colour-space C, semantic segmentation is the task of predicting a pixelwise class label $y \in \{1, \ldots, K\}^{H \times W}$. In some applications, the image x could be an RGB image of a street scene, and the K classes could include "road", "sidewalk", "building", "wall", "person", "car", etc.

To provide context for the description and terminology used below, two conventional approaches to semantic segmentation will first be described.

Likelihood-Based Semantic Segmentation

In likelihood-based semantic segmentation, a neural network may be trained to perform semantic segmentation by training it on training data consisting of pairs of images (e.g. photographs) and corresponding human-labelled segmentation maps.

For a dataset of N image-and-label pairs $\mathcal{D} = \{x_i, y_i\}_{i=1}^{N}$, the conditional distribution $p_D(y|x)$ is explicitly modelled through a likelihood $q_\theta(y|x)$ parameterised by a neural network F with weights $\theta$ and the softmax output activation function.

A straightforward, yet effective, way for a neural network to learn the class probabilities is to express the training labels $y \in \{0,1\}^{H \times W \times K}$ as a one-hot encoded label map, and to set $q_\theta$ as a pixelwise factorised categorical distribution, realised through a softmax vector. The probability mass of $q_\theta$ is then given as:

$$q_\theta(y|x) = \Pi_i^H \Pi_j^W \Pi_k^K F_\theta(x)_{i,j,k}^{y_{i,j,k}} \quad (1)$$

Since minimising the forward Kullback-Leibler divergence $KL(p_D \| q_\theta)$ with respect to $\theta$ is equivalent to minimising the cross entropy between $p_D$ and $q_\theta$, for the choice of $q_\theta$ in Eq. (1), the loss function reduces to:

$$\mathcal{L}_{ce}(\mathcal{D}, \theta) = -\mathbb{E}_{p_{D(x,y)}}[\log q_\theta(y|x)] \quad (2)$$

Typically, $F_\theta$ is implemented as a convolutional neural network (CNN) and its weights are optimized using stochastic gradient descent (SGD) or a variant thereof.

A final segmentation map can be obtained, for a given input image, by applying the argmax function along the class dimension of the predicted probabilities (i.e. for each pixel, selecting the most probable classification).

A shortcoming of this approach is that it generates semantic maps that are incoherent. For noisy real-world datasets, maximising the factorised likelihood results in unconfident predictions in regions of label-related inconsistency.

Adversarial Semantic Segmentation

It is known to try to mitigate this problem by performing conditional semantic segmentation using generative adversarial networks (GAN).

In a typical adversarial training situation, a discriminator network learns to discriminate human-annotated ground-truth segmentations (i.e. "real" labels) from predictions provided by a generator network (i.e. "fake" labels). By engaging the generator (or segmenter) and the discriminator in an alternating minimax training game, the generator is challenged to improve its predictions to provide realistic-looking segmentation predictions to fool the discriminator, ideally in a way that leads the generator to learn to produce desirable high-level structural qualities such as connectivity, inter-pixel consistency, and smoothness, without formulating these properties explicitly.

Formally, this involves training a binary discriminator network $D_\psi$ to optimally distinguish between ground truth and predicted semantic labels, while concurrently training a segmentation network $G_\phi$ to maximise the probability that prediction samples $G_\phi(x_i)$ are perceived as real by $D_\psi$.

To account for ambiguity in the labels, the segmentation network may be also be conditioned on an extrinsic noise variable, e.g. Gaussian noise $\in \sim N(0,1)$.

A non-saturated loss function for the generator can be expressed as:

$$\mathcal{L}_G(x, \phi) = -\mathbb{E}_{p_{D(x,y)}, p(\in)}[\log D_\psi(G_\phi(x, \in))] \quad (3)$$

while a non-saturated loss function for the discriminator can be expressed as:

$$\mathcal{L}_D(\mathcal{D}, \phi, \psi) = -\mathbb{E}_{p_{D(x,y)}, p(\in)}[\log(1 - D_\psi(G_\phi(x, \in))) + \log D_\psi(y)] \quad (4)$$

In essence, the GAN approach leverages the maximum likelihood learning paradigm to tailor an adaptive loss function, parameterised by D, on the training data. In contrast to explicit pixelwise likelihood maximisation, this adversarial setup learns an implicit sampler through G which has the potential to model the joint pixel configuration of the synthesised labels and capture local and global consistencies displayed by the ground truth.

In practice, simply using noise vectors as additional inputs of G does not produce diverse outputs. The lack of regularisation between the noise vector and the output is the main driving force behind mode collapse and various strategies, such as cycle consistency, have been proposed to mitigate it.

Additionally, since the loss function is a moving target, the dynamic of the adversarial training is notoriously unstable. Consequently, it is known to complement the adversarial loss term with the pixel-level cross entropy loss from Eq. 2.

The mixed supervision of adversarial and cross entropy losses can lead to improved empirical results. However, in the presence of noisy data, the two losses may have opposing goals and therefore enforcing them on the same set of parameters, in this case $\phi$, may be suboptimal. The categorical cross-entropy loss recovers the underlying probability $p_D(y|x)$, potentially with high entropy in noisy regions of the data; however, the adversarial term optimizes for low-entropy, sample-like output.

Calibrated Multimodal Adversarial Semantic Segmentation

In contrast to conventional approaches, the present embodiments decouple the two conflicting losses in a two-stage, cascaded architecture consisting of:

a first-stage likelihood-based "calibration" network $F_\theta$, optimized with $\mathcal{L}_{ce}$ (as in Eq. 1 above); and a second-stage generative "refinement" network $G_\phi$ paired with an adversary "discriminator" network $D_\psi$, which are optimized using objective terms $\mathcal{L}_G$ and $\mathcal{L}_D$, respectively, similar to those in Eqs. 3 & 4.

Advantageously, this approach of decoupling the cross entropy optimization from the adversarial optimization allows the complementary advantages of the two losses to be exploited, while avoiding adverse interactions between them that can occur when they are combined linearly.

Moreover, this approach enables $F_\theta$ to provide a good initial representation for $G_\phi$ to distill into a final refined prediction. This can result in the sampled label proposals better reflecting the underlying data distribution.

Also advantageously, well-calibrated predictions by $F_\theta$ provide a target for the predictive distribution of $G_\phi$. This has been found to result in high overall mode coverage, with stable training and fast convergence.

Intuitively, the refinement network $G_\phi$ can be thought of as a sampler from the explicit likelihood modelled by the calibration network, such that both the pixelwise class probability and object coherency are preserved.

FIG. 1 shows the overall machine-learning model 1, which comprises the calibration network 2, $F_\theta$; the refinement network 3, $G_\phi$ and the discriminator network 4, $D_\psi$. FIG. 1 also shows the forward flow of training data through $F_\theta$, $G_\phi$ and $D_\psi$, as well as the inputs to the various loss-function terms $\mathcal{L}_{ce}$, $\mathcal{L}_G$, $\mathcal{L}_D$ and $\mathcal{L}_{cal}$.

The calibration network 2 receives an input image 5 and outputs an image-sized, pixelwise, calibrated predicted label distribution 6.

The refinement network 3 receives the predicted label distribution 6 from the calibration network 2, and a Gaussian noise variable $\epsilon \sim N(0,1)$ from a random-noise generator 7. It outputs a set 8 of N predicted segmentation maps, $\hat{y}_1$, $\hat{y}_2, \ldots \hat{y}_N$, for a desired value of N, greater than one. It can thus support multimodal classification, in which a single input image can correspond to multiple valid outputs.

The discriminator network 4 receives the set 8 of N segmentation maps, as well a ground-truth segmentation map 9 for the input image 5.

The cross-entropy loss function $\mathcal{L}_{ce}$ is a function of the predicted label distribution 6 and the ground-truth label 9.

The output of the binary discriminator network 4 is used in the generator loss term $\mathcal{L}_G$ and the discriminator loss function $\mathcal{L}_D$.

The calibration loss term $\mathcal{L}_{cal}$ is a function of the predicted label distribution 6 and an average predicted segmentation map 10 which is the pixelwise arithmetic mean of the set 8 of N segmentation maps.

The objectives for $G_\phi$ and $D_\psi$ differ from those in Eqs. (3) and (4) to accommodate the preprocessing by the calibration network $F_\theta$.

The refinement network $G_\phi$ is trained to minimize a loss function that includes the loss term:

$$\mathcal{L}_G(\mathcal{D},\phi,\theta,\psi) = -\mathbb{E}_{p_{\mathcal{D}(x,y)},p(\epsilon)}[\log D_\psi(G_\phi(F_\theta(x),\epsilon))] \quad (5)$$

The discriminator network $D_\psi$ is trained to minimize the loss function:

$$\mathcal{L}_D(\mathcal{D},\phi,\theta,\psi) = -\mathbb{E}_{p_{\mathcal{D}(x,y)},p(\epsilon)}[\log(1-D_\psi(G_\phi(F_\theta(x),\epsilon)))+\log D_\psi(y)] \quad (6)$$

The full loss function, $\mathcal{L}_R$, for the refinement network $G_\phi$ also includes a calibration loss term, $\mathcal{L}_{cal}$, as follows:

$$\mathcal{L}_R(\mathcal{D},\phi,\theta,\psi) = \mathcal{L}_G(\mathcal{D},\phi,\theta,\gamma)+\lambda \mathcal{L}_{cal}(\mathcal{D},\phi,\theta)$$

where $\lambda$ is a variable weighting factor.

For optimal cross-entropy weights, $\theta^* = \mathrm{argmin}_\theta \mathcal{L}_{ce}(\mathcal{D}, \theta)$, the entropy of the model distribution, $H(q_{\theta^*})$, is equal to the entropy of the data distribution, $H(p\mathcal{D})$. Therefore, in order to calibrate the predictive distribution, a diversity regularization is imposed on the refinement network $G_\phi$ by encouraging the sample average $\bar{G}_{\phi,\theta}(x) := \mathbb{E}_{p(\epsilon)}[G_\phi(F_\theta(x), \epsilon)]$ to match the underlying class probabilities predicted by $F_\theta(x)$. That is, the calibration network is used as a target for the diversity of the samples generated by $G_\phi$.

To do this, an auxiliary fully factorized categorical likelihood $q_\phi$ can be defined:

$$q_\phi(y|x) = \prod_i^H \prod_j^W \prod_k^K \bar{G}_{\phi,\theta}(x)_{i,j,k}^{y_{i,j,k}}$$

and the reverse Kullback-Leibler divergence $\mathrm{KL}(q_\phi \| q_\theta)$ can be optimized. Since both $q_\theta$ and $q_\phi$ are categorical distributions, the divergence can be computed exactly.

The calibration loss term can thus be given as:

$$\mathcal{L}_{cal}(\mathcal{D},\phi,\theta) = \mathbb{E}_{p_\mathcal{D}(x)}\mathbb{E}[\log q_\phi(y|x)] - \Sigma_{i,j,k} \bar{G}_{\phi,\theta}(x)_{i,j,k} \log F_\theta(x)_{i,j,k}] \quad (8)$$

Implementation Details

A consequence of the loss decomposition is that $\theta$ can be kept fixed while $\phi$ and $\psi$ are learnt. This allows some embodiments to use a pre-trained calibration network $F_\theta$ in inference mode only, thus lowering the overall peak computational burden.

$\mathcal{L}_{cal}$ is computed using a Monte Carlo estimation. In practice, it has been found that the number of predicted samples in the set 8 necessary for a good performance may, at least in some situations, be in the order of ten—e.g. N=10.

A deep learning framework may be used that allows for the samples to be subsumed in the batch dimension and therefore efficiently computed on CPUs.

FIG. 2 outlines an exemplary training procedure for the model using a learning rate $\eta$ and a calibration weighting $\lambda$. In this example, the model that is trained includes the calibration network, $F_\theta$. However, in other embodiments, the calibration network could be trained separately, e.g. using different training data.

FIG. 3 outlines an exemplary use of the model in an inference mode (i.e. after training).

Although not essential, conditioning the refinement network and the discriminator network on the input image has been found to improve the quality of the results, at least in some situations.

More generally, the conditioning flexibility of the present approach enables any existing black-box semantic segmentation model B, which may not be able to provide multiple segmentation maps for an input image, to be extended by conditioning $F_\theta$ on the output of B.

Example I—Synthetic Dataset

An intuitive insight into the mechanics of the present calibration loss is provided by the following simple one-dimensional regression task.

The input $x \in [0,1]$ is mapped to $y \in \mathbb{E}$ using the following stochastic relation:

$$y \sim \begin{cases} (0.5-\pi)\mathcal{N}(0.5, \sigma)+(0.5+\pi)\mathcal{N}(-0.5, \sigma), & x \in [0, 0.4) \\ (0.5-\pi)\mathcal{N}(-1.25x+1.5, \sigma)+ \\ (0.5+\pi)\mathcal{N}(1.25x-0.5, \sigma), & x \in [0.4, 0.8) \\ \mathcal{N}(0.5, \sigma), & x \in [0.8, 1) \end{cases}$$

We generated nine different scenarios by varying the degree of mode bias $\pi \in \{0, 0.1, 0.4\}$ as well as the mode noise $\sigma \in \{0.01, 0.02, 0.03\}$.

For each configuration we trained three 4-layer multilayer perceptrons (MLPs) for F, G and D respectively, with calibration loss coefficient $\lambda=1$ and a learning rate of $\eta=0.0001$. Then we compared the results to the case where $\lambda=0$ (i.e. with the refinement loss function having no calibration loss term).

For statistical significance, each experiment was repeated five times. Note that unlike the categorical likelihood used in semantic segmentation tasks, we employed a Gaussian likelihood with fixed scale parameter of 1. This changed the formulation of Eqs. (2) and (8) to mean-squared error losses.

Figure 4:
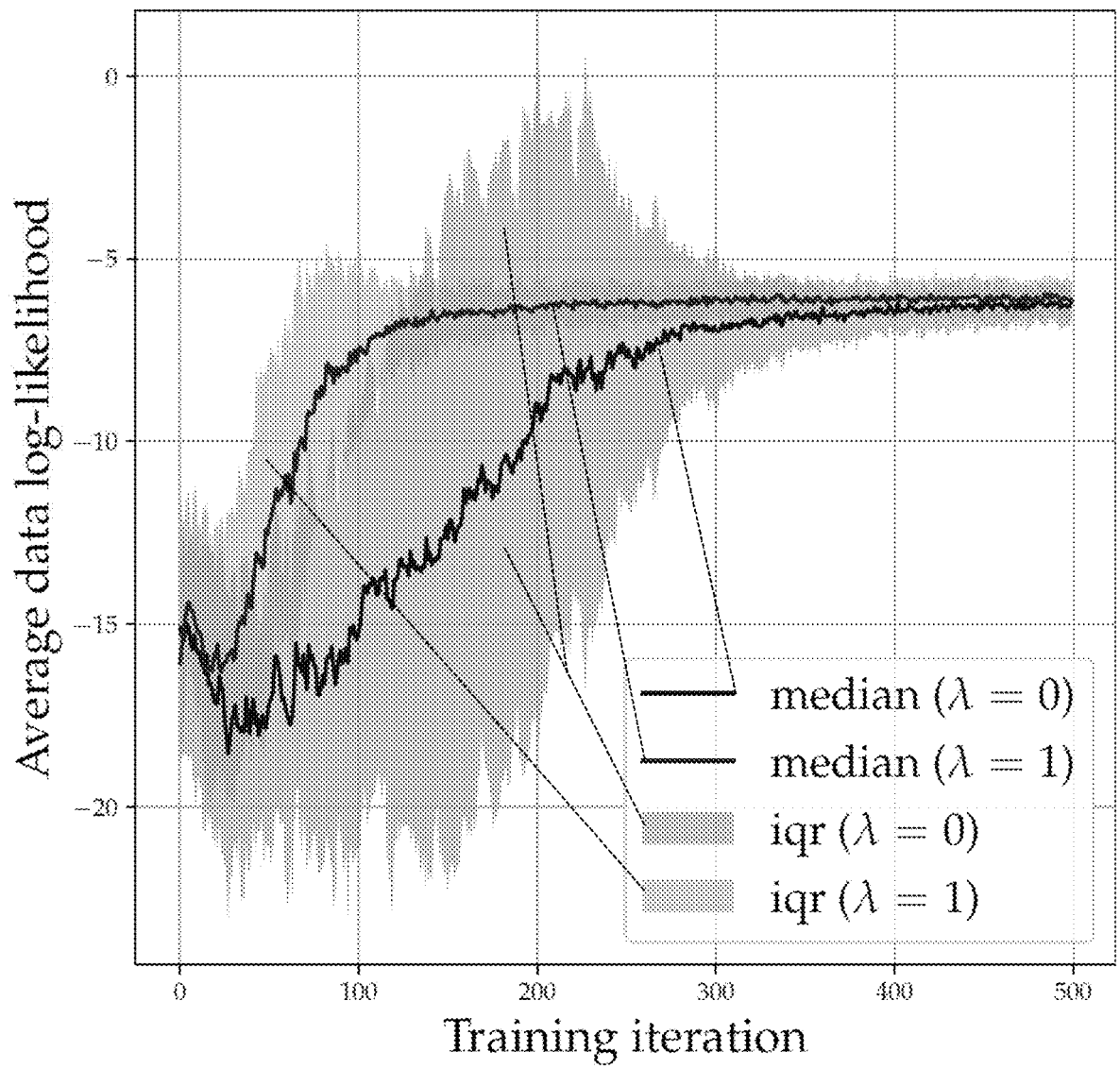
FIG. 4 is a graph of data log-likelihood for an example simplistic implementation of a model embodying the invention.
Figure 5:
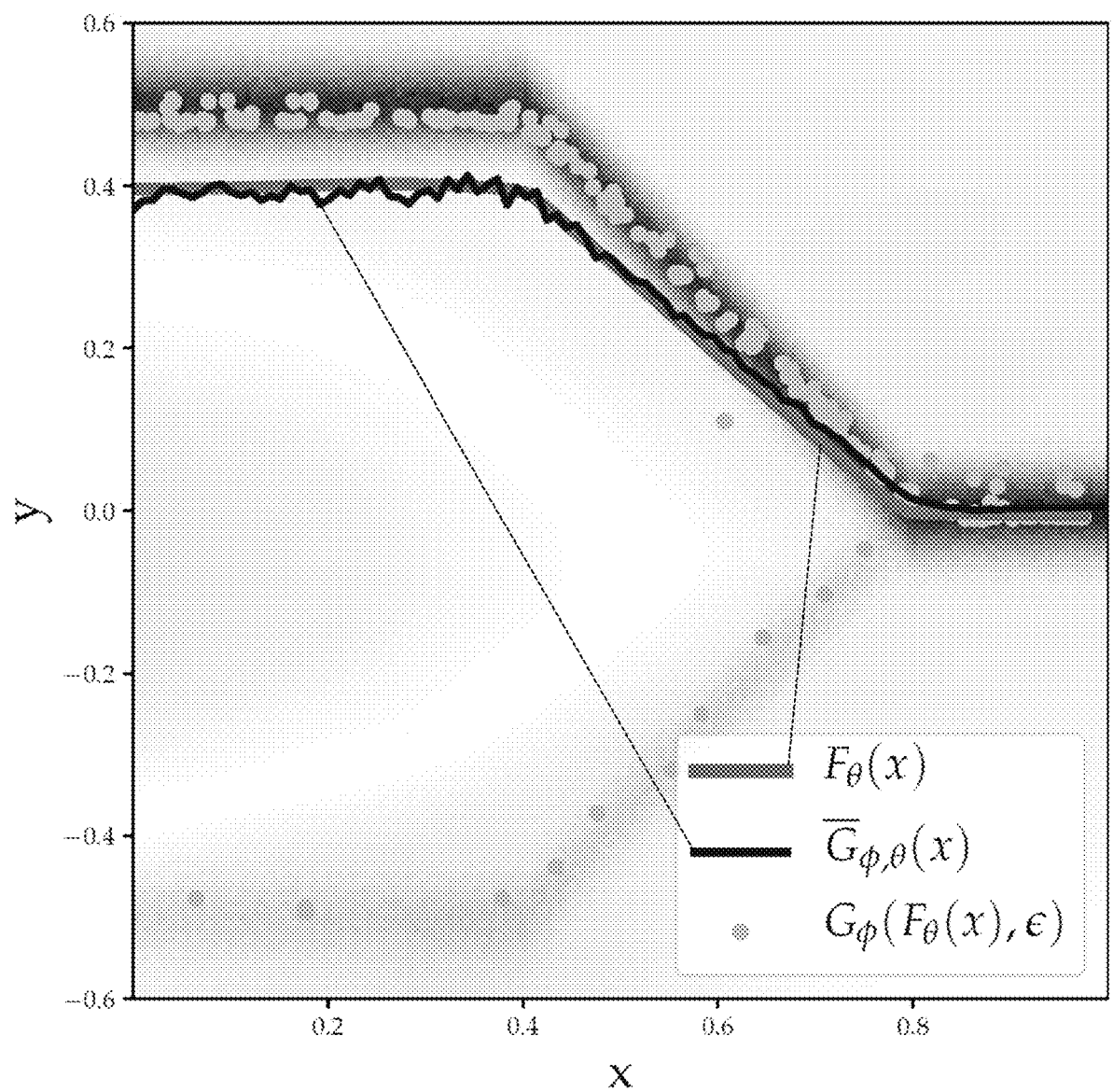
FIG. 5 is a plot of various outputs extracted from the example simplistic implementation when a calibration loss term is used.
Figure 6:
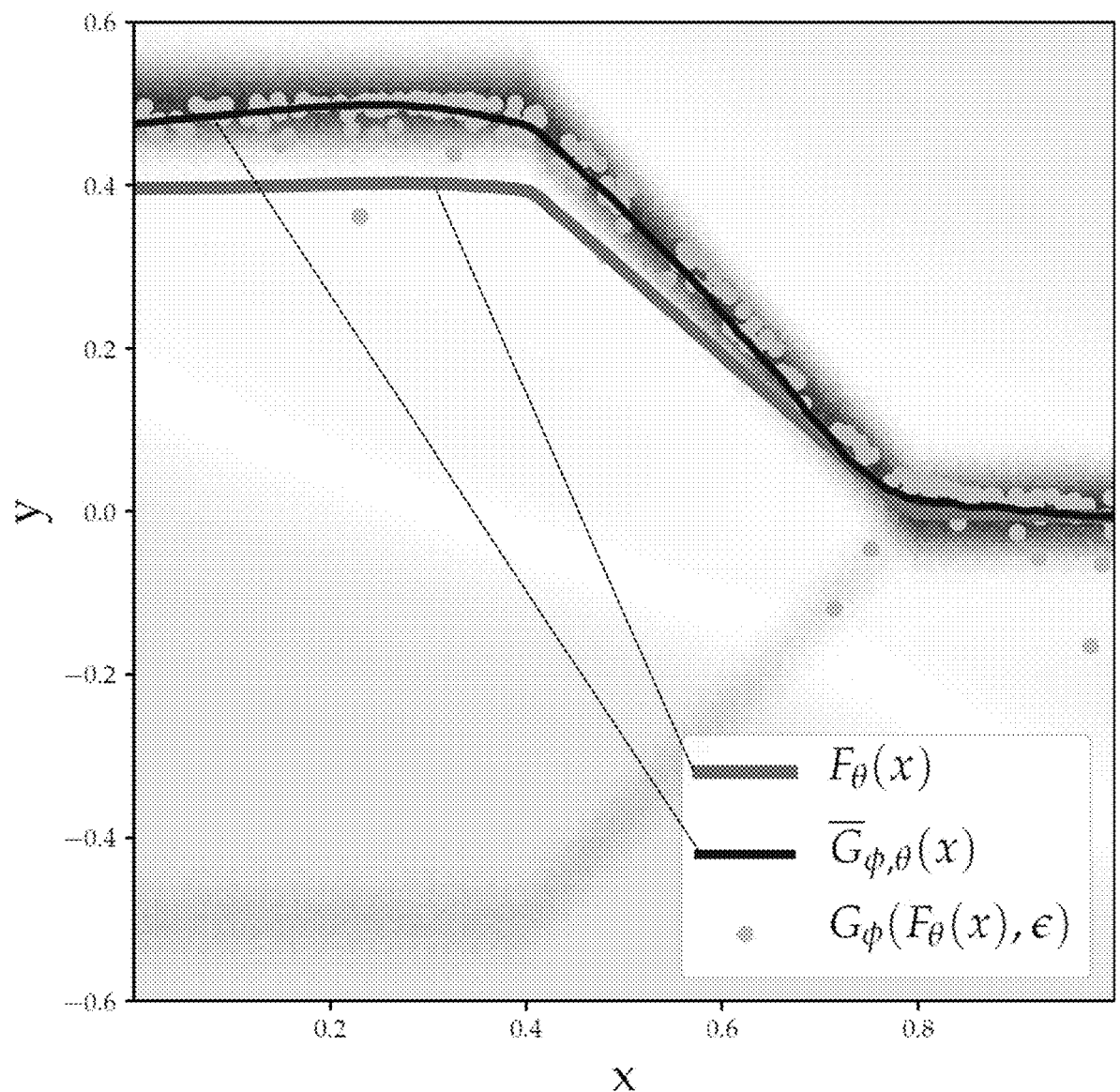
FIG. 6 is a plot of various outputs extracted from the example simplistic implementation when a calibration loss term is not used.

FIGS. 4, 5 and 6 show the data configurations along with the converged calibration network outputs, the data likelihood over time for $\lambda=1$ and $\lambda=0$ and samples from the GANs with the discriminator's probabilities in the background.

FIG. 4 shows the data log-likelihood, averaged over all 90 experiments.

FIG. 5 represents the results from a high bias and noise configuration ($\pi=0.4$, $\sigma=0.03$) with calibration loss. The ground truth data is shown in diffuse black and the output predictions of the refinement (generator) network as circular spots (coloured light blue in the original). The calibration target (represented by the thicker line—coloured red in the original) is tightly followed by the average output from the refinement network (represented by the thinner line—coloured blue in the original). The discriminator output is represented in the background shading, with "fake" being in a region spreading rightwards from x=0, y=0 (coloured blue in the original), and "real" being the darker regions around the top, right and bottom edges of the graph (coloured red in the original).

FIG. 6 shows the same experiment as FIG. 5, but without the calibration loss term. This often results in a mode collapse. The "fake" discriminator output is in the top-right half of the plot, while the "real" discriminator output is in the bottom-left half.

The results show a quicker convergence with less mode oscillation when using the calibration loss. The sample plots show that mode collapse is also less prominent in this case.

Example I—Modified Cityscapes

This experiment followed an evaluation scheme in which a 19-class version of the CityScapes Dataset (www.cityscapes-dataset.com) was augmented with five additional classes which ambiguously complement the corresponding CityScapes category: (road, road2), (sidewalk, sidewalk2), (car, car2), (vegetation, vegetation2) and (person, person2).

In a ground-truth segmentation map, for each of these original five classes, a random subset of the pixels belonging to the class were exchanged with the counterpart class (e.g. road2 instead of road), according to a fixed probability.

We used the class-flipping probabilities of 8/17, 7/17, 6/17, 5/17, 4/17, respectively, and measured the quality of the samples using a mean GED metric, as specified in the paper "*A probabilistic u-net for segmentation of ambiguous images*" by Simon Kohl, et al., Advances in Neural Information Processing Systems, 2018, pages 6965-6975.

Figure 7:
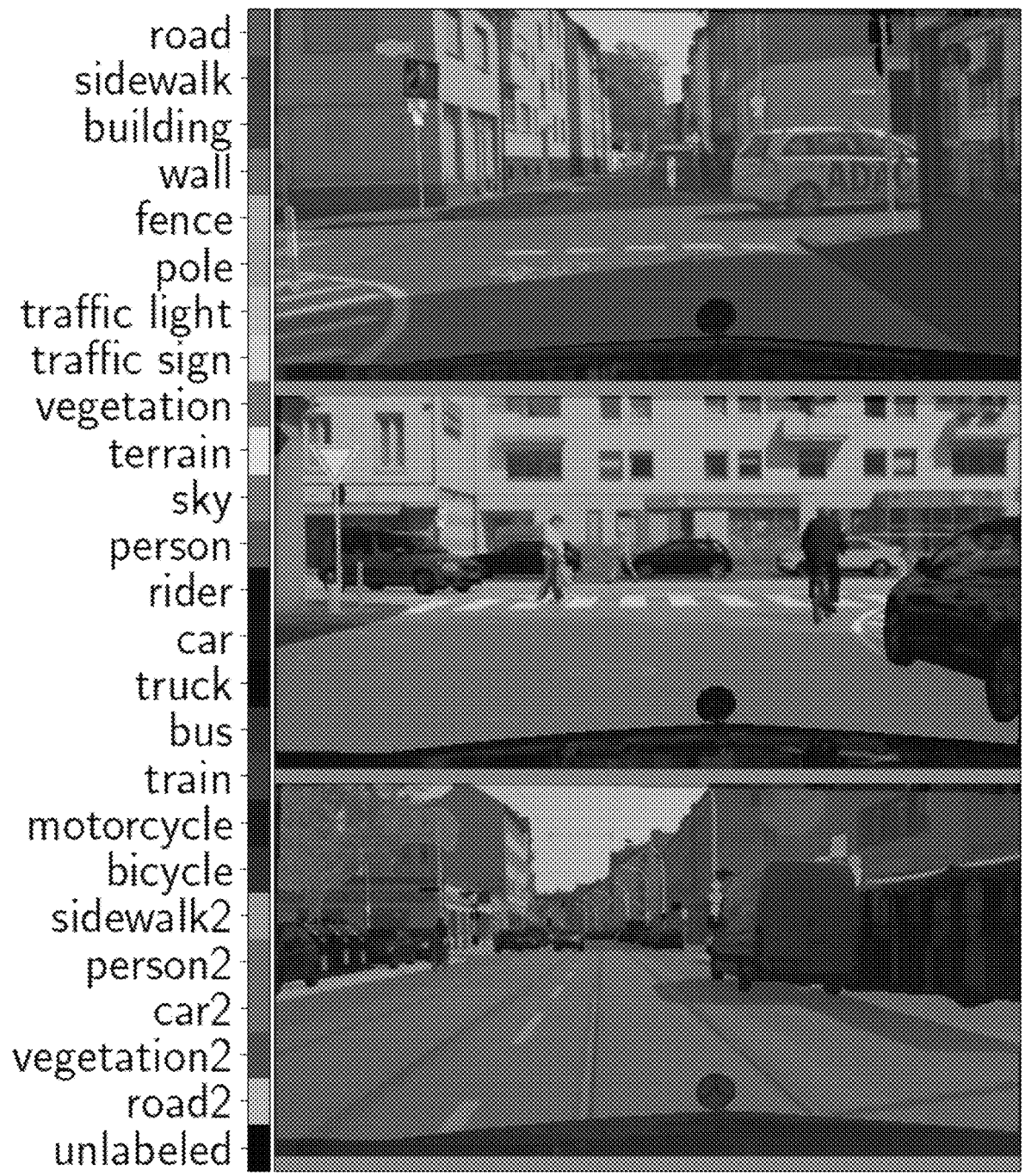
FIG. 7 shows three street scenes from the Cityscapes dataset with added ambiguity.

FIG. 7 shows three different street scenes overlaid with corresponding labels.

Figure 8:
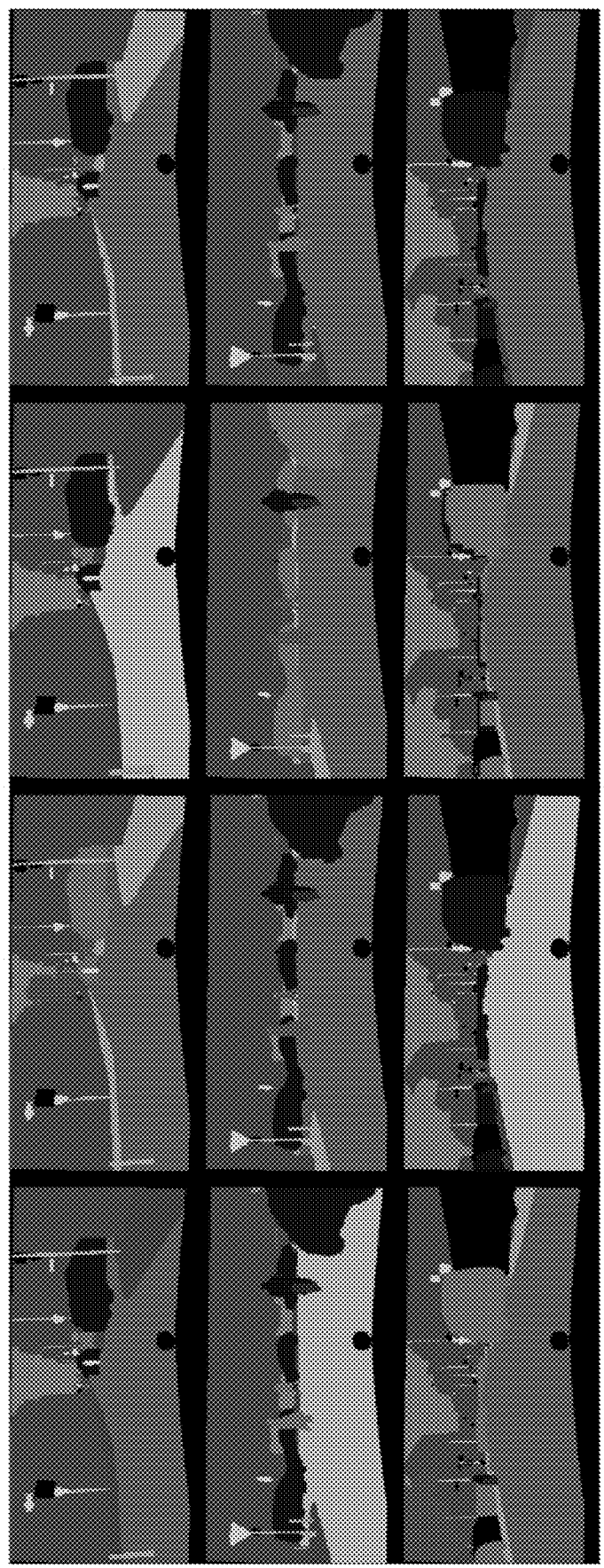
FIG. 8 shows four predicted segmentation maps for each of the three street scenes, generated by a model embodying the invention.

FIG. 8 shows four different predictions, arranged horizontally along each row, obtained from the refinement network, for each of the three street scenes (stacked vertically).

It can be seen that the refinement network has learnt to generate diverse, coherent segmentation maps that are consistent with the input images and emerge due to the ambiguities in the input images.

Figure 9:
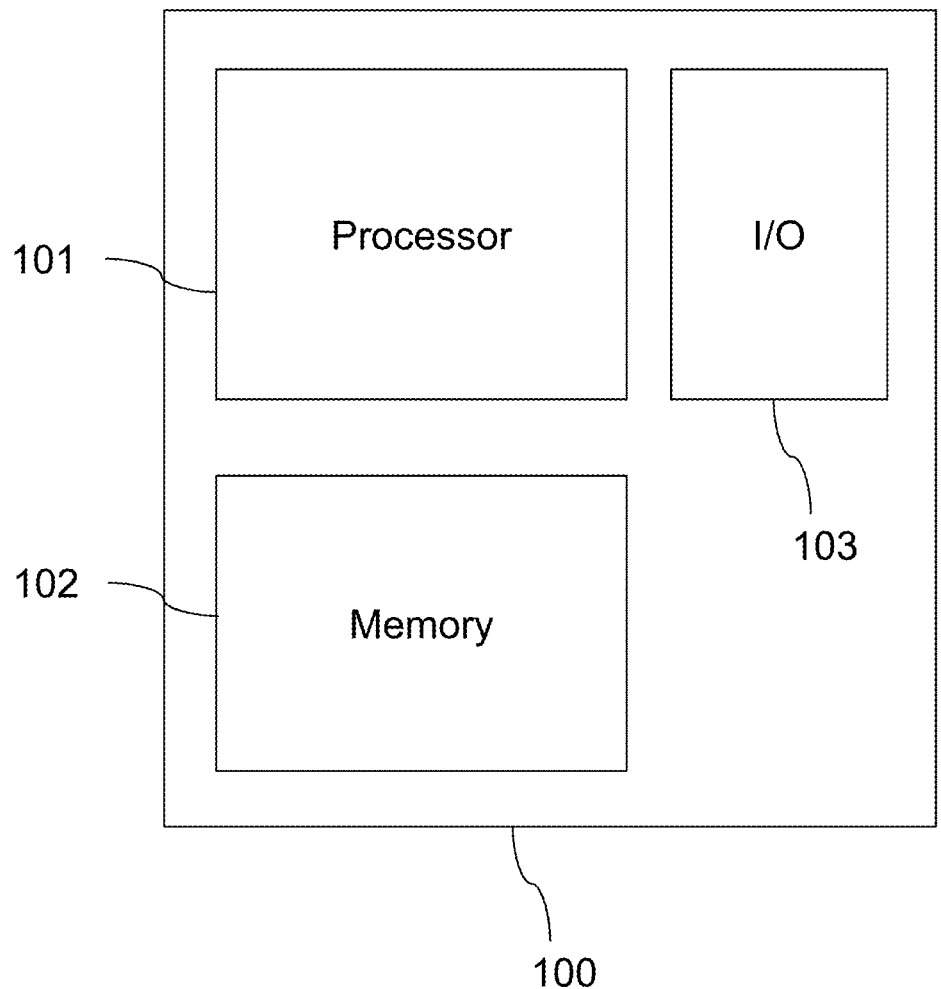
FIG. 9 is a schematic diagram of a computer system embodying the invention.

FIG. 9 shows an exemplary computer processing system on which embodiments may be implemented. A computer 100 comprises a processor 101 (e.g. an Intel™ processor) arranged to execute software stored in a memory 102. The processor 101 also uses the memory 102 for reading and writing data, such as input data, intermediate calculation results, and output data. Software may control the processor 101 to implement any of the methods disclosed herein. The computer 100 has input/output peripherals—e.g. for receiving training data and/or for exporting data encoding the trained network.

The model may be trained centrally (e.g. on a GPU-based supercomputer) and the trained model replicated and installed on other devices, such as a car guidance or warning system or in a self-driving vehicle. Alternatively, the training may take place in the field, e.g. as continual learning within a control system of an autonomous vehicle.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A computer system, comprising:
one or more processors, the one or more processors configured to train a model for use in semantic image segmentation;
wherein the model includes a discriminator neural network and a refinement neural network, the refinement neural network configured to receive a predicted label distribution for an image, obtain one or more random values from a random or pseudo-random noise source, use the one or more random values to generate a plurality of predicted segmentation maps from the received predicted label distribution, and output the plurality of predicted segmentation maps to the discriminator neural network; and
wherein the one or more processors are configured to train the refinement neural network using an objective function that is a function of an output of the discriminator neural network and that further includes a term representative of a difference between the predicted label distribution and an average of the plurality of predicted segmentation maps output by the refinement neural network for the predicted label distribution.

2. The computer system of claim 1, wherein the one or more processors are configured to implement the model.

3. The computer system of claim 1, wherein the refinement neural network is configured to receive the predicted label distribution from a calibration neural network, and wherein the model further comprises the calibration neural network.

4. The computer system of claim 3, wherein the calibration neural network is configured to receive input images and to output respective predicted label distributions for the input images by performing likelihood-based semantic segmentation.

5. The computer system of claim 3, wherein the one or more processors are configured to train the calibration neural network and the discriminator neural network.

6. The computer system of claim 1, wherein the one or more processors are configured to train the refinement neural network and the discriminator neural network using a generative-adversarial-network training process.

7. The computer system of claim 6, wherein the one or more processors are configured to condition the refinement and discriminator neural networks on the input image.

8. The computer system of claim 1, wherein the one or more processors are configured to train the discriminator neural network using a loss function relating to an ability of the discriminator neural network to discriminate between predicted segmentation maps output by the refinement network and ground-truth label data.

9. The computer system of claim 1, wherein the objective function used to train the refinement neural network comprises a sum of a first objective that depends on an output of the discriminator network and a second objective term that depends on said difference between the predicted label distribution and the average of the predicted segmentation maps generated by the refinement network.

10. The computer system of claim 1, wherein the one or more processors are configured to calculate the average of the predicted segmentation maps by calculating a pixel-wise arithmetic mean of the plurality of predicted segmentation maps.

11. The computer system of claim 1, wherein the one or more processors are configured to determine said difference between the predicted label distribution and the average of the predicted segmentation maps by determining the forward or reverse Kullback-Leibler divergence of the predicted label distribution and the average of the predicted segmentation maps.

12. The computer system of claim 1, wherein the one or more processors are configured to train any of said neural networks using a gradient descent process.

13. A method for training a model for use in semantic image segmentation, the model comprising a discriminator neural network and a refinement neural network, the refinement neural network being configured to receive a predicted label distribution for an image, obtain one or more random values from a random or pseudo-random noise source, use the one or more random values to generate a plurality of predicted segmentation maps from the received predicted label distribution, and output the plurality of predicted segmentation maps to the discriminator neural network;
the method comprising:
training the refinement neural network using an objective function that is a function of an output of the discriminator neural network and that further includes a term representative of a difference between the predicted label distribution and an average of the plurality of predicted segmentation maps output by the refinement neural network for the predicted label distribution.

14. The method of claim 13, wherein the image is of a street scene.

15. A non-transitory computer readable storage medium storing instructions that, when executed by one or more processors of a computer system, cause the one or more processors to perform a method for training a model for use in semantic image segmentation, the model comprising a discriminator neural network and a refinement neural network, the refinement neural network being configured to receive a predicted label distribution for an image, obtain one or more random values from a random or pseudo-random noise source, use the one or more random values to generate a plurality of predicted segmentation maps from the received predicted label distribution, and output the plurality of predicted segmentation maps to the discriminator neural network;
the method comprising:
training the refinement neural network using an objective function that is a function of an output of the discriminator neural network and that further includes a term representative of a difference between the predicted label distribution and an average of the plurality of predicted segmentation maps output by the refinement neural network for the predicted label distribution.

16. The non-transitory computer readable storage medium of claim 15, wherein the method comprises:
implementing the refinement neural network and the discriminator neural network.

17. A non-transitory computer readable storage medium storing instructions that, when executed by one or more processors of a computer system, cause the one or more processors to perform a method for implementing a trained model for use in semantic image segmentation, the trained model including a refinement neural network, the method comprising, for the refinement neural network:
receiving a predicted label distribution for an image;
obtaining one or more random values from a random or pseudo-random noise source;
using the one or more random values to generate a plurality of predicted segmentation maps from the received predicted label distribution; and
outputting the plurality of predicted segmentation maps.

18. The non-transitory computer readable storage medium of claim 17, wherein the method comprises:
training the refinement neural network using an objective function that is a function of an output of the discriminator neural network and that further includes a term representative of a difference between the predicted label distribution and an average of the plurality of predicted segmentation maps output by the refinement neural network for the predicted label distribution.

19. The non-transitory computer readable storage medium of claim 17, wherein the method comprises:
calculating and outputting, by the trained model, an average of the plurality of predicted segmentation maps.

20. The non-transitory computer readable storage medium of claim 17, wherein the method comprises:
producing the predicted label distribution from an input image using a trained calibration neural network.

* * * * *